United States Patent

Van Zanten et al.

[11] Patent Number: 5,070,459
[45] Date of Patent: Dec. 3, 1991

[54] ANTI-BLOCKING AND/OR WHEEL SLIP REGULATING SYSTEM

[75] Inventors: Anton Van Zanten, Ditzingen; Wolf-Dieter Ruf, Waldstetten; Friedrich Kost, Stuggart; Karl-Josef Weiss, Waiblingen, all of Fed. Rep. of Germany

[73] Assignee: Robert Bosch GmbH, Stuttgart, Fed. Rep. of Germany

[21] Appl. No.: 469,604
[22] PCT Filed: Oct. 5, 1988
[86] PCT No.: PCT/EP88/00883
§ 371 Date: Apr. 16, 1990
§ 102(e) Date: Apr. 16, 1990
[87] PCT Pub. No.: WO89/03331
PCT Pub. Date: Apr. 20, 1989

[30] Foreign Application Priority Data
Oct. 15, 1987 [DE] Fed. Rep. of Germany ....... 3734878

[51] Int. Cl.$^5$ ............................................. B60T 8/10
[52] U.S. Cl. ................................ 364/426.02; 303/100
[58] Field of Search ...................... 364/426.01, 426.02; 303/100, 105, 106

[56] References Cited
U.S. PATENT DOCUMENTS

| | | | |
|---|---|---|---|
| 3,658,388 | 4/1972 | Hasegawa | 303/100 |
| 3,967,862 | 7/1976 | Hunter et al. | |
| 4,033,633 | 7/1977 | Miller et al. | 364/426.02 |
| 4,060,284 | 11/1977 | Steiner et al. | 303/100 |
| 4,309,060 | 1/1982 | Leiber et al. | 303/105 |
| 4,349,876 | 9/1982 | Lindemann | 364/426.02 |
| 4,435,768 | 3/1984 | Arikawa | 364/426.02 |
| 4,497,026 | 1/1985 | Braschel et al. | 303/105 |
| 4,585,280 | 4/1986 | Leiber | 303/105 |
| 4,932,726 | 6/1990 | Iwata et al. | 303/105 |

FOREIGN PATENT DOCUMENTS
2204092 8/1972 Fed. Rep. of Germany.
3545901 6/1987 Fed. Rep. of Germany.

OTHER PUBLICATIONS
Microprocessors and Microsystems, vol. 6 (9/82), No. 7, pp. 381-388.

Primary Examiner—Salvatore Cangialosi
Attorney, Agent, or Firm—Felfe & Lynch

[57] ABSTRACT

A anti-lock brake control system and/or a drive slip control system is described the slippage value of which for the brake pressure control is to be set close to the maximum of the $\mu$-slippage curve, on the stable branch, that is, during the control.

For this purpose, a short pressure pulse is generated in a phase where the pressure is maintained constant and the difference of the reference speed and the wheel speed is integrated (J) over a time $T_I$ and the maximum of the difference ($D_{max}$) is determined in this time. The two values are divided $$\left( SR = \frac{J}{D_{max}} \right)$$

and the resulting values is used for determining the slippage.

9 Claims, 4 Drawing Sheets

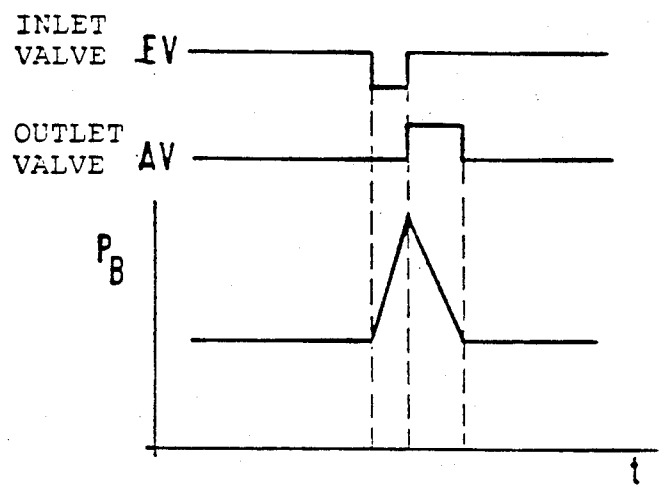
FIG. 1
FIG. 3
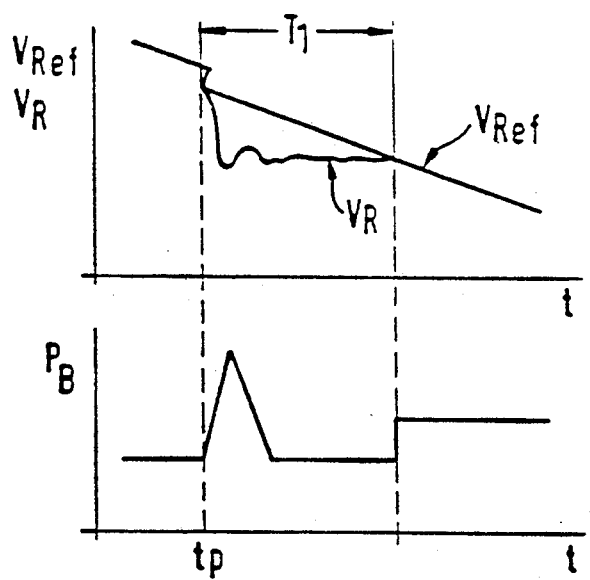

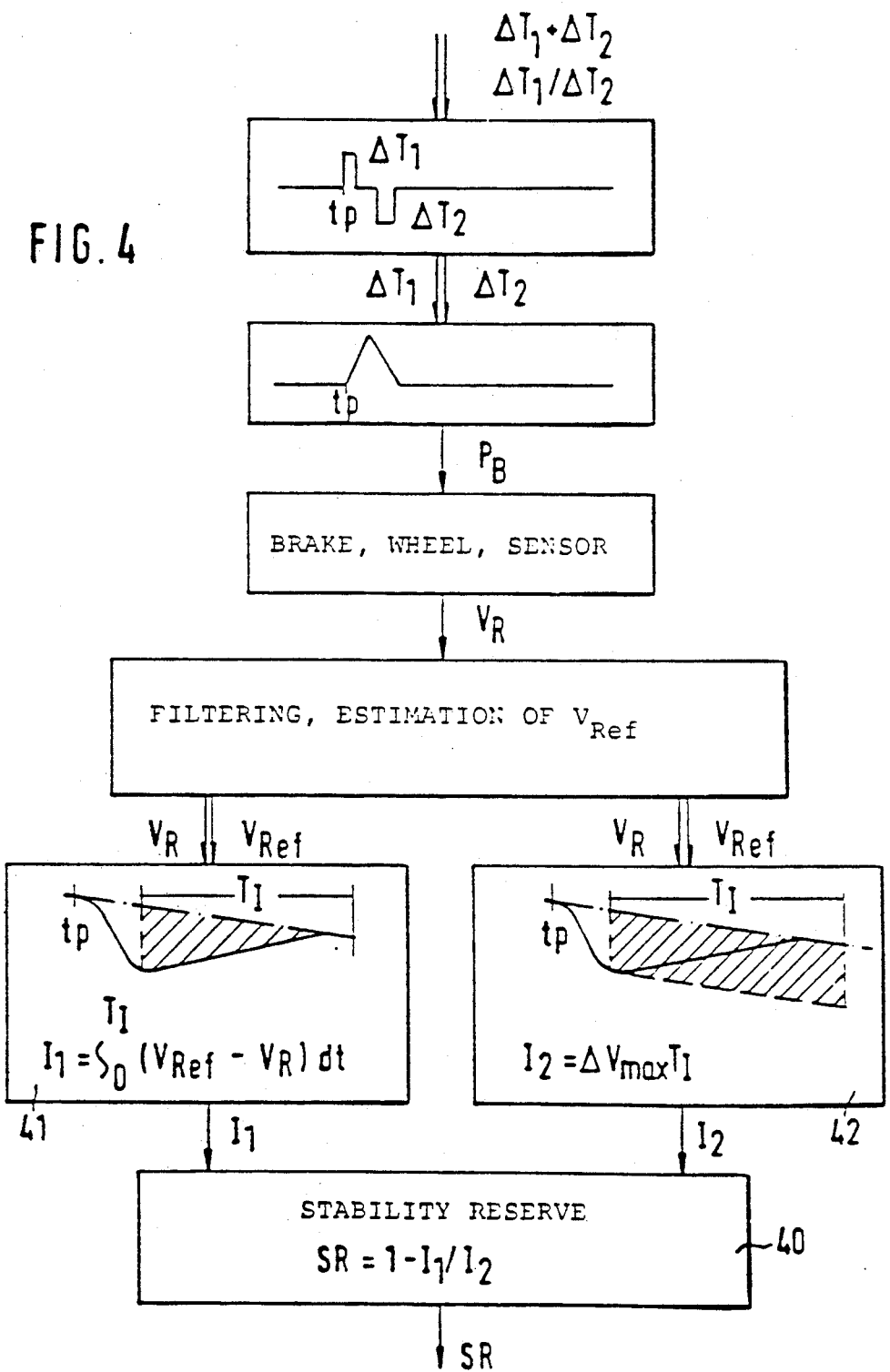

ANTI-BLOCKING AND/OR WHEEL SLIP REGULATING SYSTEM

BACKGROUND OF THE INVENTION

The invention relates to a wheel slippage control system, more particularly, to an anti-lock brake control system and/or a drive-slip control system. The system includes wheel speed sensors which generate signals corresponding to the wheel speed. An evaluation circuit receives the wheel speed signals and generates a reference speed and slippage signals for brake pressure control, the curve of the reference speed being approximated to the curve of the vehicle speed. First brake pressure control devices actuated by the slippage signals cause a variation in brake pressure which depends on wheel slippage; the devices permit pressure build-up, pressure reduction, and maintaining the pressure constant.

It is a pronounced object of all known wheel control algorithms to maintain the directly controlled wheel slippage within a smallest possible range around the maximum of the slippage curve. A typical plot of braking force versus wheel slippage is shown in FIG. 5. The Bosch system ABS2 is based on the principle of increasing the wheel slippage until the wheel-tire-system becomes unstable. Subsequently, the wheel slippage is decreased until the wheel-tire-system has reached again a stable point on the slippage curve. When this point is reached, the slippage is increased again and the control cycle is repeated. Instability detection is a main feature of the anti-lock brake control system.

When the slippage curve decreases abruptly after the maximum, the wheel rapidly decelerates when the maximum is surpassed even when the braking torque is maintained only slightly above the value which corresponds to the maximum of the slippage curve. In this case, instability can be definitely detected without problems. It is possible, however, that the rapid wheel deceleration causes a great wheel slippage and, hence, a substantial loss of braking power and lateral guidance.

When, as opposed thereto, the slippage curve hardly decreases after the maximum, as on ice, for example, the wheel speed decreases only slowly when the braking torque is maintained just above the value which corresponds to the maximum of the slippage curve. In this case instability detection is much more difficult. It is possible that instability might be detected only at a great wheel slippage which in turn may cause a high loss in lateral guidance.

In order to achieve a good braking effect and a highest possible lateral guidance, the slippage curve maximum must not be exceeded. In order to meet further demands regarding lateral guidance, the tire slippage should be kept below $\lambda^*$, where $\lambda^*$ signifies the slippage where the maximum of the slippage curve is reached. In FIG. 5, e.g., the maximum braking force occurs when $\lambda^* = 20\%$. Since the wheel-tire-system is stable for slippage values smaller than $\lambda^*$, instability detection cannot be used to control for slippage values smaller than $\lambda^*$.

Controlling for slippage values smaller than $\lambda^*$ would be possible if the slippage curve and the instantaneous slippage were known. Since a determination of this kind requires auxiliary signals which are difficult to measure, like the vehicle speed, an alternative must be found to accomplish the object more economically. One such possible alternative is increasing the slippage curve.

Generally, the slope of the slippage curve decreases monotonously with a rising slippage. The relation between wheel slippage and slope of the slippage curve is then clear. The requirement of controlling for a certain slippage value can then be replaced by the requirement of controlling for a certain slope of the slippage curve. The greater the slope of the slippage curve at the operating point, the more stable is the operating point. The smaller the slope of the slippage curve, the smaller is the stability of the operating point. A negative slope means a instable operating point. The slope is hence a measure for the stability reserve of the operating point.

Earlier applications already suggested estimating the slope of the slippage curve from the bounce response of the wheel. For this purpose, the brake pressure is abruptly increased and the wheel speed is subsequently analyzed. This method involves two problems:
1. In case of smaller friction coefficients, the inaccuracy of the wheel speed signal makes an analysis of the wheel speed more difficult. On ice, for example, $\lambda^* \approx 4\%$ and the pressure bounces, which can only be very small, cause only very small slippage changes which cannot be reliably analyzed because of the aforesaid inaccuracy.
2. The wheel behavior after the pressure bounce is affected by several interfering factors such as interferences in the friction coefficient of the road and deviations of the forces regarding the contact surface of the tire. In case of smaller pressure bounces, these changes can completely override the transient wheel behavior because of the pressure bounce. This renders a reliable analysis of the wheel speed with respect to the slope of the slippage curve impossible. An increase of the pressure bounces meant an improvement, however, the deviations from the desired slippage would increase, causing disadvantageous losses in braking power, lateral guidance and comfort.

SUMMARY OF THE INVENTION

According to the invention, second brake pressure control devices are provided which supply a short term brake pressure change (pulse) when the first brake pressure control devices effect maintaining the pressure constant. A stability reserve is determined from the reference speed and the wheel speed which result from the short term pressure change, and a signal is derived from this stability reserve for changing the brake pressure so as to adjust the slippage to be on the stable portion of the slippage curve and in the vicinity of the maximum braking force.

A reliable instability detection requires a measurement of clear wheel speed changes. Since this cannot be achieved with small bounces in the wheel brake cylinder pressure, however, the invention suggests changing the pressure pulse-like rather than bounce-like. This pulse can be generated by rapidly succeeding pressure build-up and pressure reduction bounces (FIG. 1). A pulse-like brake pressure change is defined as a brake pressure build-up by opening the inlet valve immediately followed by a brake pressure reduction by opening the outlet valve. Ideally, the intake and outlet valve times are adjusted to each other such that wheel brake cylinder pressure $P_B$ is equal before and after the pulse. Further, these two times are to be selected such that this pulse clearly changes (at least for a short period of time) the tire slippage. The immediate pressure reduction after the high pressure build-up bounce prevents, after the pulse, too rapid an increase of the tire slippage, i.e. during the analysis while the tire has approached the maximum of the slippage curve.

The following proceeds on the assumption that the pressure has exactly the same value after the pulse as it has before the pulse. If the tire slippage is on the stable side of the slippage curve before the pressure pulse then the tire slippage rapidly decreases after the pulse. If the tire slippage before the pressure pulse is on the "horizontal" portion of the slippage curve, then the slippage is not decreased anymore after the pressure pulse. If the tire slippage is on the instable portion of the slippage curve before the pressure pulse, then the tire slippage is further increased after the pressure pulse.

If the tire slippage before the pressure pulse is on the stable side of the slippage curve, the difference of the friction coefficient (braking force) before and immediately after the pressure pulse determines how fast the tire returns to the stable point on the slippage curve. When the friction coefficient, immediately after the pressure pulse, corresponds to the maximum of the slippage curve, then the speed at which the tire slippage moves toward the stable point on the slippage curve is a value for how far the stable point is below the maximum of the slippage curve.

The speed at which the tire returns to the stable point on the slippage curve after the pressure pulse is then a value indicating the stability reserve of the operating point.

Another possible definition for the stability reserve is the following:

$$SR = \frac{\bar{V}_{Ref} - \bar{V}_R}{\bar{V}_{Ref}}$$

where $\bar{V}_R$ is the mean acceleration of the wheel and $\bar{V}_{Ref}$ is the mean acceleration of the reference or vehicle speed after the pressure pulse.

Further, equally valid definitions for analyzing the wheel behavior after the pressure pulse are possible. FIG. 4 gives an alternative definition of stability reserve.

When calculating the stability reserve, however, it must be taken into consideration that various dead times and delay times cause the wheel speed signals to occur with a time lag with respect to the pressure pulse. Further, it is usually necessary to filter the measured wheel speed signal before it can be used for analysis.

As already mentioned, a significant short-term wheel speed change can thus be achieved without a pressure change in the wheel brake cylinder after the pulse as compared to before the pulse. This permits acquiring information about the stability of the tire slippage and also whether the tire slippage is on the instable side of the slippage curve "without principally changing the pressure." It is thus possible to avoid a sliding down of the reference speed.

Further, a control for a positive stability reserve permits controlling for a tire slippage smaller than λ*.

As already mentioned, the tire behavior after the pressure pulse is crucial to the stability reserve of the tire. It is an object of the invention to detect this tire behavior.

BRIEF DESCRIPTION OF THE DRAWINGS

FIG. 1 shows a pressure pulse and the valve actuation signals IV and OV required therefore, FIG. 4 is a block diagram showing an alternative way of recovering the stability reserve.

DETAILED DESCRIPTION OF THE PREFERRED EMBODIMENT

Figure 2:
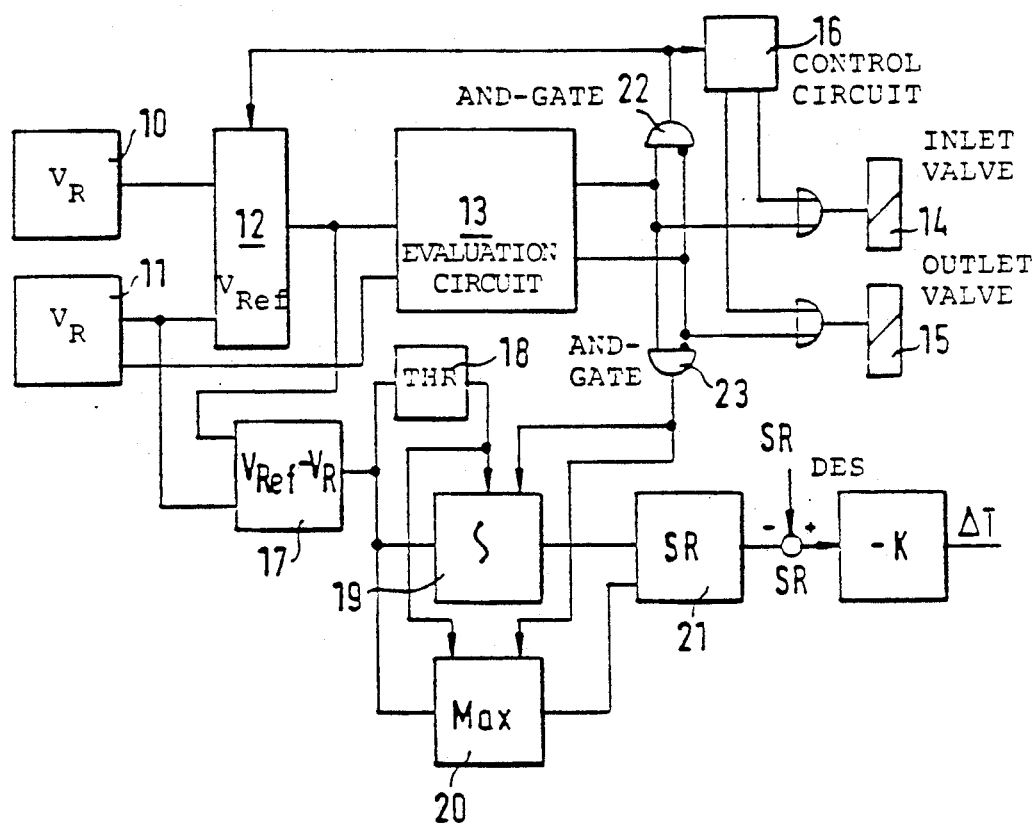
FIG. 2 is a circuit diagram for carrying out the inventive idea, FIG. 3 are diagrams of the pressure pulse curve and the curve of the wheel speed changes caused thereby.
Figure 5:
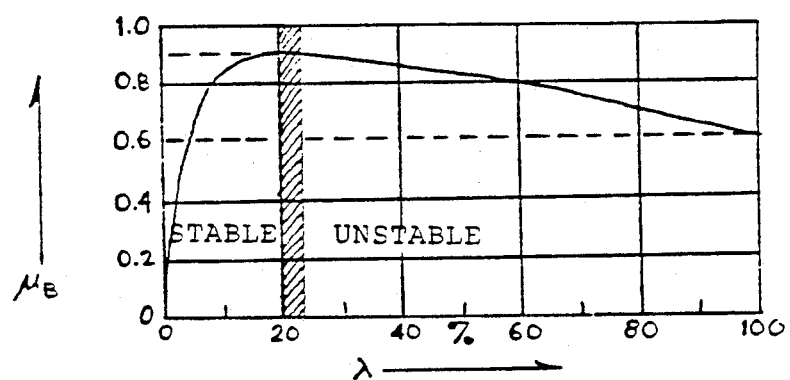
FIG. 5 is a typical adhesion vs. slippage curve.

In FIG. 2 two sensors 10 and 11 for the wheel speed supply signals to a block 12 for forming the reference speed $V_{Ref}$. The sensor 10 of the example represented is required for this purpose only; otherwise only the evaluation of the signal of sensor 11 is considered for controlling the brake pressure.

In order to form slippage signals for the brake pressure control, the reference speed signals $V_{Ref}$ and the wheel speed signal $V_R$ of the sensor 11 are supplied to an evaluation circuit 13. An inlet valve 14 and an outlet valve 15 are provided as known for brake pressure control.

The circuit of FIG. 2 has an additional control circuit 16 for the valves 14 and 15, a subtractor 17, a threshold stage 18, an integrator 19, a maximum former 20 and a divider 21.

When actuating the inlet valve 14 without simultaneously actuating the outlet valve 15 (held constant) via the evaluation circuit 13, the control circuit 16 is actuated via an AND-gate 22 actuating the valves 14, 15 corresponding to FIG. 1 and a pressure pulse is generated. The block 12 is actuated at the same time and the reference speed $V_{Ref}$ is set equal to the instantaneous wheel speed. A further AND-gate 23 serves to activate the integrator 19 and the maximum-value former 20 which are deactivated when $(V_{Ref} - V_R)$ falls below a prescribed comparative value (in 18).

FIG. 3 gives the curves of the wheel speed $V_R$, the reference speed $V_{Ref}$ and the wheel brake pressure $P_B$. Beginning with time tp the wheel brake pressure is changed into pulses. As already mentioned, the wheel speed is set equal to the reference speed at this point such that the difference $(V_{Ref} - V_R) = 0$ when $t = tp$. The slope of the reference speed is assumed to be known here. Beginning with time tp, the difference $(V_{Ref} - V_R)$ formed in block 17 is determined during period $T_I$ and integrated (in integrator 19) and, simultaneously, the maximum of this difference during period $T_I$ is determined. After $T_I$ (milliseconds), with $T_I$ being freely selected, and, for example, amounting to 100 milliseconds, the integration and the search for the maximum difference is interrupted. Subsequently, the integral value is divided in the divider 21 by $T_I$ and the maximum difference. The quotient SR is by definition the stability reserve.

When the stability reserve is great, the difference $(V_{Ref} - V_R)$ rapidly declines again. A small $T_I$ can be selected in this case, e.g. 50 msec. When the stability reserve is small, however, the difference $(V_{Ref} - V_R)$ declines only slowly. In this case, where the maximum of the slippage curve is almost reached, a greater $T_I$ can be selected, e.g. 150 msec or up to $\bar{V}_R \leq 0$. The brake pressure control can hence move rapidly toward the maximum of the slippage curve and it can remain close to the maximum for a longer period of time. In the embodiment, the period $T_I$ is changed by the decline of the difference $(V_{Ref} - V_R)$ which is monitored by the threshold sensor 18. Before the next pressure pulse is supplied, the slippage should be smaller than $\lambda^*. \overline{V}_R \leq 0$ can be criterion here.

The initial statement that the pressure after the pulse is to be equal to the one before the pulse is not necessarily required. However, since it is known whether the pulse is to be increased, decreased or maintained constant only after the pulse and after analyzing time, it appears to be efficient to maintain the pressure at the same level after the pulse as well as before the pulse.

It should also be mentioned that it is also possible to use negative pulses (i.e. first, pressure is reduced, then, shortly afterwards, built up again). This can be particularly advantageous when the maximum of the slippage curve is reached.

Since the clarification as to whether there is a control at an optimum operating point becomes more difficult with the wheel inertia torque increasing, it is particularly advantageous to use the suggested method for the driven axle (regardless of whether the engine is engaged or not) and for four wheel drive.

The signal SR at the output of the divider 21 is now used for determining the control deviation. For this purpose, the signal SR is compared to a desired value $SR_{des}$. Subsequently, the control deviation ($SR_{des}-SR$) is multiplied by the amplification factor K. The negation of the K * ($SR_{des}-SR$) is the valve opening time $\Delta T_v$, where negative values mean pressure reduction and positive values mean pressure build-up:

$$\Delta T_v = -K^* (SR_{des} - SR) \qquad (1)$$

The value $SR_{des}$ must be selected according to the required lateral guidance, where $SR_{des}=0$ in case there is no special lateral guidance required, e.g. straight braking on a regular road surface. $SR_{des}$ values which are greater than 0 mean there is an increased demand of lateral guidance and controlling for a slippage smaller than $\lambda^*$. The $SR_{des}$ value is prescribed by a superimposed control which monitors the vehicle movement and affects the latter via the value $SR_{des}$ such that the control over the vehicle (steering and stability) is improved during a ABS braking.

The pressure build-up and reducing gradients are generally different. Therefore the valve opening time calculated according to (1) must be corrected:

Pressure build-up: $T_{v,k} = -K \times K_{bup} \times (SR_{des} - SR)$ (2)

Pressure reduction: $T_{v,k} = K \times K_{red} \times (SR_{des} - SR)$ (3)

It further applies that the pressure gradients change with the wheel brake cylinder pressure. Therefore, the correcting factors $K_{bup}$ and $K_{red}$ change with the wheel brake cylinder pressure:

$K_{bup} = K_{0,bup} + K_{1,bup} \times PWBC$ $K_{red} = K_{0,red} + K_{1,red} \times PWBC$ where $K_{0,bup}$ and $K_{0,red}$ are fixed values, $K_{1,bup}$ and $K_{1,red}$ are fixed proportionality factors and PWBC is the wheel brake cylinder pressure.

In order to generate the pressure pulse, the pressure build-up and pressure reduction times must be selected such that:

1. the pressure pulse always has a fixed prescribed value or
2. the maximum wheel-reference speed difference always has a prescribed value.

The advantage of 1. is that the pressure pulses do not become too great but can still be selected great enough to carry out a reliable determination of SR close to the maximum of the slippage curve. The disadvantage of 1. is that great values of SR cannot be determined such that they are reliable.

The advantage of 2. is that even great values can be reliably determined since the necessary speed difference is always reached. The disadvantage of 2 is that for great values of SR, the pressure pulse can be very great.

Too great SR values cannot be reliably calculated. Therefore, $SR_{des}$ must be limited to a maximum value since pressure reduction otherwise could be constantly continued.

In FIG. 4, the stability reserve SR is recovered in a block 40 by forming the expression $$SR = 1 - I_1/I_2$$

where $$I_1 = \int_0^{T_I} (V_{Ref} - V_R) dt.$$

or $$I_1 = \int_0^{t_p + T_I} (V_{Ref} - V_R) dt.$$

and is recovered in a block 41 whereas $I_2 = (V_{Ref} - V_R)_{max} T_I$ is recovered in a block 42.

We claim:

1. Anti-lock brake control system for controlling slippage of wheels on a vehicle moving at a speed represented by a vehicle speed curve, the wheel slippage versus braking force being represented by a slippage curve having a stable portion (low slippage) where the braking force increases to a maximum as slippage increases, and an unstable portion (high slippage) where the braking force decreases as slippage increases further, said system comprising
   at least one wheel speed sensor which generate signals corresponding to the wheel speed,
   an evaluation circuit which receives said wheel speed signals and generates a reference speed and slippage signals for brake pressure control, the curve of the reference speed being approximated to the curve of the vehicle speed, said evaluation circuit means effecting maintaining the brake pressure constant during periods in which the difference between the wheel speed and the reference speed does not exceed a prescribed value,
   brake pressure control means actuated by said slippage signals and causing a variation in brake pressure depending upon wheel slippage, said brake pressure control means effecting pressure build-up, pressure reduction, and maintaining the pressure constant, and
   means for effecting a pulse-like brake pressure change during a period in which said evaluation circuit means effects maintaining the pressure constant,
   means for determining a stability reserve from the reference speed and the wheel speed which result from the pulse-like pressure change, and
   means for deriving a signal from the stability reserve for changing the brake pressure so as to adjust the slippage to be on the stable portion of the slippage curve and at the maximum braking force.

2. Anti-lock brake control system in accordance with claim 1, characterized in that beginning with the pressure change the integral J of the difference between reference speed and wheel speed ($V_{Ref}-V_R$) is formed for a short period of time $T_I$, in that, moreover, the maximum of this difference ($V_{Ref}-V_R$)$_{max}$ is determined during this period and in that from the determined values, the stability reserve $$SR = \frac{J}{(V_{Ref}-V_R)_{max}}$$

is formed.

3. Anti-lock brake control system in accordance with claim 2, characterized in that the time $T_I$ is variable and depends upon the decline of the difference.

4. Anti-lock brake control system in accordance with claim 2, characterized in that at the beginning of the integration phase the references speed $V_{Ref}$ is set equal to the speed of the wheel considered.

5. Anti-lock brake control system in accordance with claim 2, characterized in that the stability reserve SR is formed by additionally considering the time $T_I$ in the denominator.

6. Anti-lock brake control system in accordance with claim 1, characterized in that the stability reserve SR is recovered by forming the quotient $$SR = \frac{\bar{V}_{Ref} - \bar{V}_R}{\bar{V}_{Ref}}$$

where $\bar{V}_R$ is the mean acceleration of the wheel and $\bar{V}_{Ref}$ is the mean acceleration of the reference speed.

7. Anti-lock brake control system in accordance with claim 1, characterized in that the stability reserve according to the relation $$SR = 1 - I_1/I_2$$

where $I_1$ is the time integral of the difference $\Delta = (V_{Ref}-V_R)$ over a short period of time $T_I$ and $I_2$ is the product from the difference $\Delta$ and the time $T_I$.

8. Anti-lock brake control system in accordance with claim 7, characterized in that the time $T_I$ begins with the start of the pressure change.

9. Anti-lock brake control system in accordance with claim 7, characterized in that the time begins with the start of the maximum of the difference.

* * * * *

UNITED STATES PATENT AND TRADEMARK OFFICE
CERTIFICATE OF CORRECTION

PATENT NO. : 5,070,459

DATED : December 3, 1991

INVENTOR(S) : Anton van Zanten et al.

It is certified that error appears in the above-identified patent and that said Letters Patent is hereby corrected as shown below:

Col. 3, line 35, delete line 35 and replace with $$-- \; SR = \frac{\bar{\dot{V}}_{Ref} - \bar{\dot{V}}_R}{\dot{V}_{Ref}} \; --$$

Col. 3, line 36, delete "$V_R$" and replace with $-- \bar{\dot{V}}_R --$.

Signed and Sealed this

Twelfth Day of October, 1993

BRUCE LEHMAN

*Attest:*

*Attesting Officer*     *Commissioner of Patents and Trademarks*